April 13, 1965  W. B. HEDGEPETH  3,177,845
DEVICE FOR COOLING AND FINISHING FOODS
Filed July 11, 1960  3 Sheets-Sheet 3

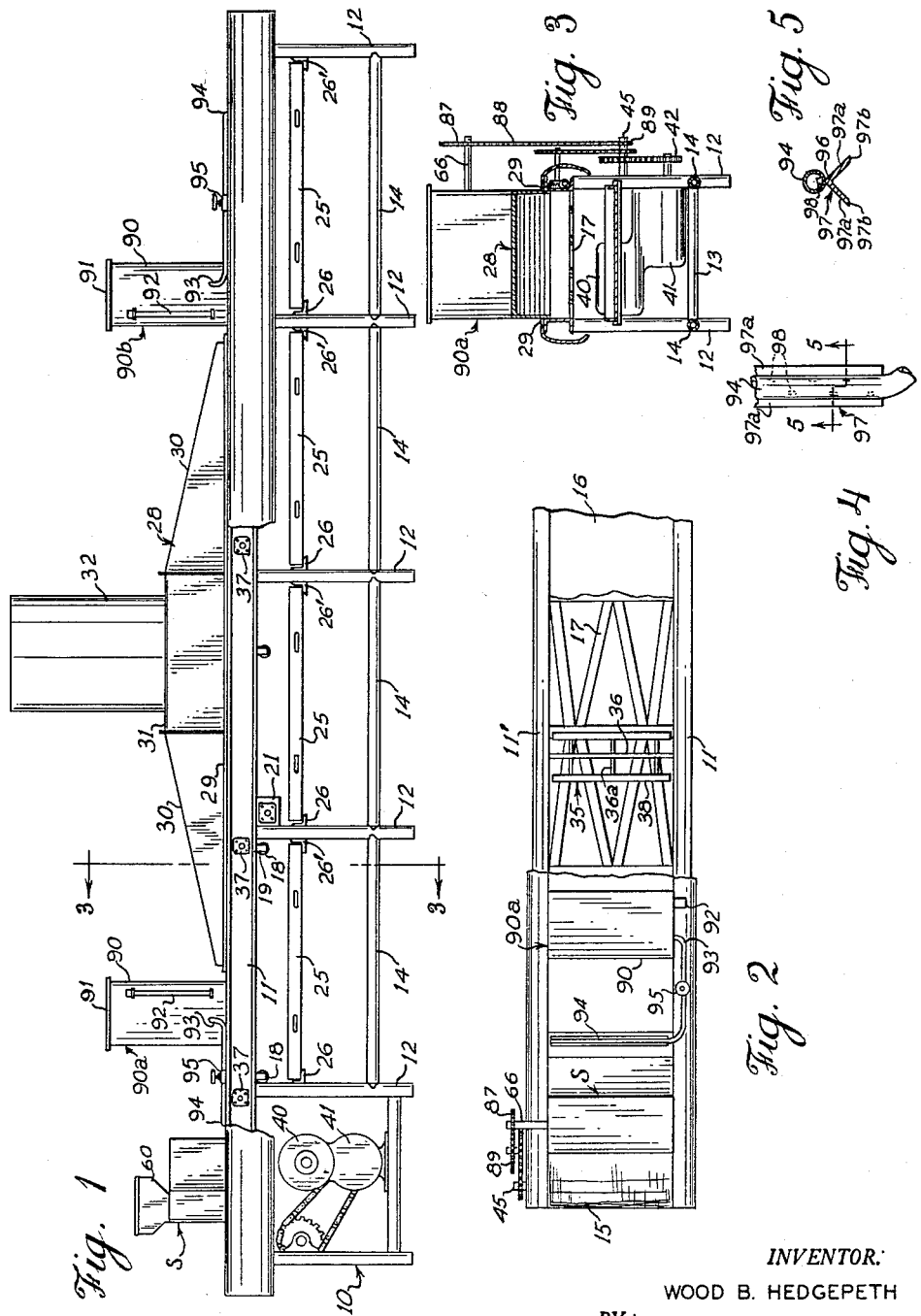

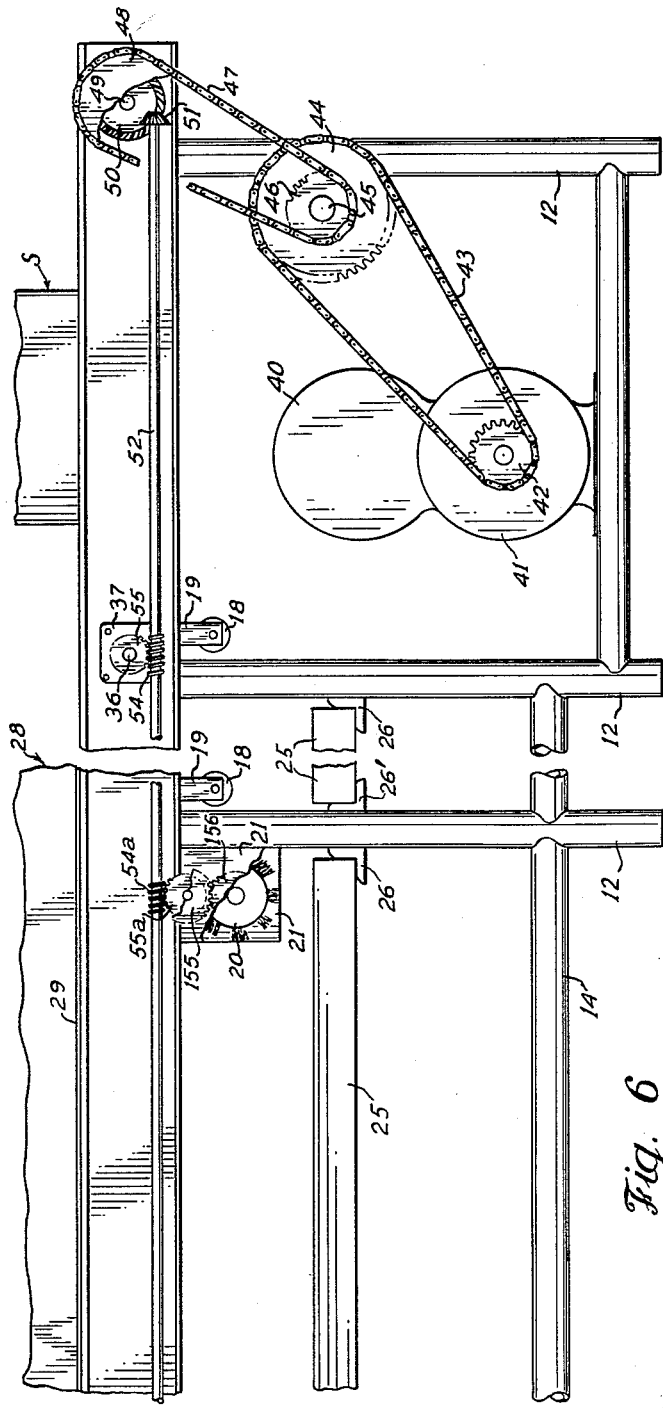
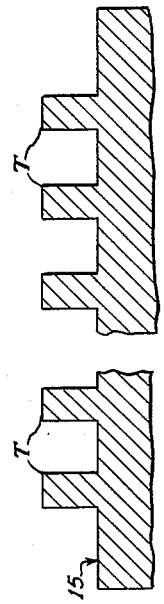
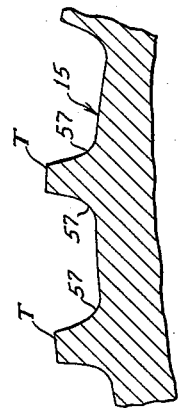
INVENTOR:
WOOD B. HEDGEPETH
ATTORNEY

INVENTOR.
WOOD B. HEDGEPETH
BY
ATTORNEY

United States Patent Office 3,177,845
Patented Apr. 13, 1965

3,177,845
DEVICE FOR COOLING AND FINISHING FOODS
Wood B. Hedgepeth, 1000 Peachtree St. NE.,
Atlanta, Ga.
Filed July 11, 1960, Ser. No. 41,992
1 Claim. (Cl. 118—16)

This invention relates to food processing machinery, and is more particularly concerned with a device for cooling and finishing foods which have been cooked.

Many foods, such as nuts, pumpkin seeds, sunflower seeds and the like, must be further processed and cooled after they are cooked. In the case of nuts, the nuts must be salted, oil applied, and cooled before packaging.

The present invention provides a simple, economical and efficient means for finishing and cooling a large variety of cooked products. It is highly adaptable, completely automatic, and yields a high quality finished product. The device is so designed as to be easily maintained at the degree of sanitation required for the commercial handling of foods.

It is therefore among the objects of the present invention to provide a food cooler and finisher which is fully automatic and continuous in operation.

It is another object of the present invention to provide a food cooler and finisher which will cool and finish a large variety of food products.

Another object of the present invention is to provide a food cooler and finisher which meets the highest standards of sanitary operation.

A further object of the present invention is to provide a food cooler and finisher which yields a very high quality product.

A still further object of the present invention is to provide a device which is durable in construction, efficient in operation, and well designed to meet the demands of economic manufacture.

And a further object of the present invention is to provide a method for finishing such foods as nuts which is both economical and far superior in the quality of the finished product.

Other and further objects of the present invention will become apparent from consideration of the following specification when taken in conjunction with the accompanying drawings, in which:

FIG. 1 is a side elevational view, partly broken away, of one form of the present invention.

FIG. 2 is a partial top plan view of that form of the invention shown in FIG. 1.

FIG. 3 is a transverse cross sectional view taken on the line 3—3 of FIG. 1.

FIG. 4 is an enlarged detail view of the oil applicator pipe.

FIG. 5 is a cross sectional view taken on the line 5—5 of FIG. 4.

FIG. 6 is a view of a part of the side of the machine opposite to that shown in FIG. 1, and showing drive means.

FIG. 7 is a partial transverse cross sectional view of a drive roller used in the present device.

FIG. 8 is a partial longitudinal cross sectional view of the drive roller shown in FIG. 7.

Figure 9:
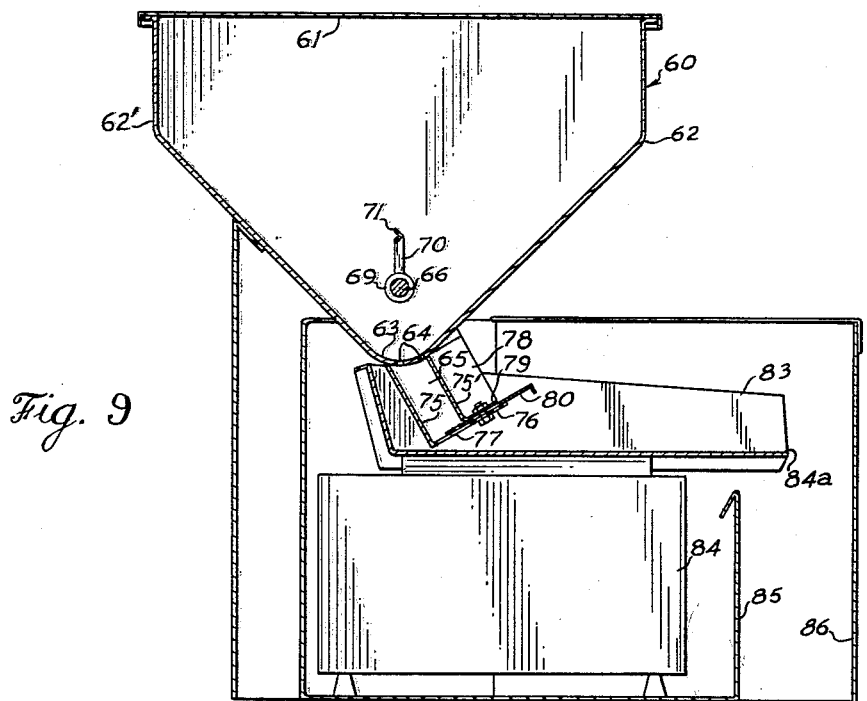
FIG. 9 is a longitudinal cross sectional view of an automatic salter to be used in conjunction with the present invention.

It will be understood that the device here presented by way of illustration is in no way restrictive, but is merely one preferred embodiment of the broad inventive concept.

Briefly, the present invention comprises a machine including a frame supporting a conveyor, having mounted over the conveyor the applicators which are required for the particular food to be finished. A hood covers a substantial portion of the conveyor, and air is drawn through the conveyor and food product thereon, and discharged through the hood and a vent pipe.

One or more mixers are disposed adjacent the conveyor to provide even finishing and cooling of the product. To maintain cleanliness throughout operation, means are provided to brush the particles from the conveyor, and drip pans are disposed thereunder to catch bits of product which fall from the conveyor.

Referring now more specifically to the drawings, it will be seen that the device comprises a frame 10 which is made up of a pair of longitudinal channel shaped members 11 and 11' supported by a plurality of leg members 12. The leg members 12 are joined by transverse braces 13 and by longitudinal braces 14, all preferably being of round pipe or similar smooth surface stock. Though any shape material will work as efficiently, the round stock is preferred to facilitate ease in cleaning.

At each end of the device is a roller, as drive roller 15, which is adapted to carry a conveyor belt 16 which is preferably of perforated or flexible meshed grating material to carry the food product as described in detail later. To support the forward flight of belt 16 throughout its length, there is a lattice-work 17 secured to the bottom of the channel shaped members 11 and 11'.

To support the return flight of conveyor belt 16, a plurality of rollers 18 transverse to the belt 16 are disposed below the lattice-work 17, and are supported by brackets 19 which are attached, as by welding, to channel members 11, 11'.

Below the return flight of conveyor 16 is a rotating brush 20 axially transverse to the belt (best seen in FIG. 6) which has stiff bristles of nylon or like material to engage the belt. The brush 20 is supported by plates 21 which depend from channel members 11, 11'. The brush is driven (by means to be hereinafter described) in the direction to give brushing action opposite to the travel of the return flight of the belt 16 in order to remove crumbs and other refuse from the belt.

Below the lattice-work 17 and return flight is a plurality of drip trays 25 supported by a pair of complementary angle members 26, 26' attached to the leg members 12. The trays 25 merely rest on the angle members 26, 26' so that they may be easily removed for cleaning.

Substantially centrally of the device is a hood 28 provided with a hammerlock 29 at its lower edge in order to support the hood 28 on the channel members 11, 11'. The hood slopes upward from each end as at 30 to the center portion 31 to allow proper air flow to an exhaust or vent pipe 32. A fan (not shown) within the pipe 32 pulls cooling air through the open conveyor belt, loose product, hood and out through vent pipe 32.

During the processing, the product must be stirred to provide even and thorough finishing and cooling. This is done by mixers as at 35 slightly above the belt 16. The mixers 35 individually comprise a central shaft 36 transverse to the belt and journaled for rotation as at 37. Extending radially from the shaft 36 are arms 36a which carry paddles 38 to engage the food particles. The entire assembly is rotated (by means to be hereinafter described) to tend to move the food particles in the direction opposite to the travel of the product, thus providing complete mixing and stirring. Any required number of mixers may be used, depending on the particular product and process.

The drive arrangement is best shown in FIGS. 1 and 6 of the drawings. There is, at one end of the device, a motor 40 in combination with a gear reduction unit 41.

A sprocket 42 on the gear reduction unit 41 drives a chain 43 which is trained over a sprocket 44 on jack shaft 45. Also on shaft 45 is a sprocket 46 which drives chain 47, chain 47 driving a sprocket 48 which is mounted on a drive roller shaft 49.

Also on the shaft 49 is a hypoid gear 50 with its complementary gear 51 fixed on a shaft 52 running the full length of the frame 10 to supply power to the various components of the invention.

A worm, as at 54, is put into the shaft 52 wherever it is necessary to have a driving means. The worm 54 has its associated gear 55 which is attached to the end of shaft 36 of a mixer such as mixer 35. The worm 54a drives the gear 55a. On the same shaft is a gear 155 which meshes with gear 156 to drive the brush 20. It will be readily seen that a similar arrangement may be used to drive a large variety of devices.

The conveyor belt contemplated for use with the present device is the wire belt known in the trade as a balanced weave belt. Though it is usually recommended by the manufacture of such belts that they be pulled, it has been found that, with the drive means to be here disclosed, excellent results may be had by pushing the belt.

In use with nuts, for instance, where oil and salt are applied, there is a marked tendency for the belt to become gummed with a mixture of oil, salt grains, and nut meal, which inevitably becomes produced to some extent. If the belt were pulled rather than pushed, it would remain under tension at all times, since in practice the belt must hang in suspension even though in several spans, as during the return flight.

With the usual woven or meshed belts, adjacent linkages provide some amount of play, play which never manifests itself if the belt is constantly under tension. On the other hand, if the tension is relaxed this play develops, and linkages that were intimate become loose, and those loose may become more distorted and produce new points of contact.

As the belt 16 passes over the drive roll 15 and the idler tail roller (not shown), the belt is subjected to a compression and stretching at the respective rolls. This is in fact a squeezing of the belt linkages, first one way and then the other, so that oil and solids are squeezed from linkage points of contact, and migrate to more accessible portions of the wire forming the belt. Here the brushes can more readily remove the adhering matter.

The drive roller 15 is shown in FIGS. 7 and 8 of the drawings. Attention is directed to FIG. 7 which shows a partial transverse cross section of the drive roller. The teeth T of the roller 5 are machined on the roller, and are so spaced that the teeth fit into every other space in the belt. The curved base 57 of the teeth T conforms to the spiral configuration of the belt and holds the belt securely for driving. Looking at FIG. 8, it will be seen that in longitudinal cross section the teeth are of substantially rectangular shape, and are so spaced as to occupy every other opening in the belt.

With the above arrangement, the conveyor belt 16 will lie flat on and conform to the lattice-work support 17.

Figure 10:
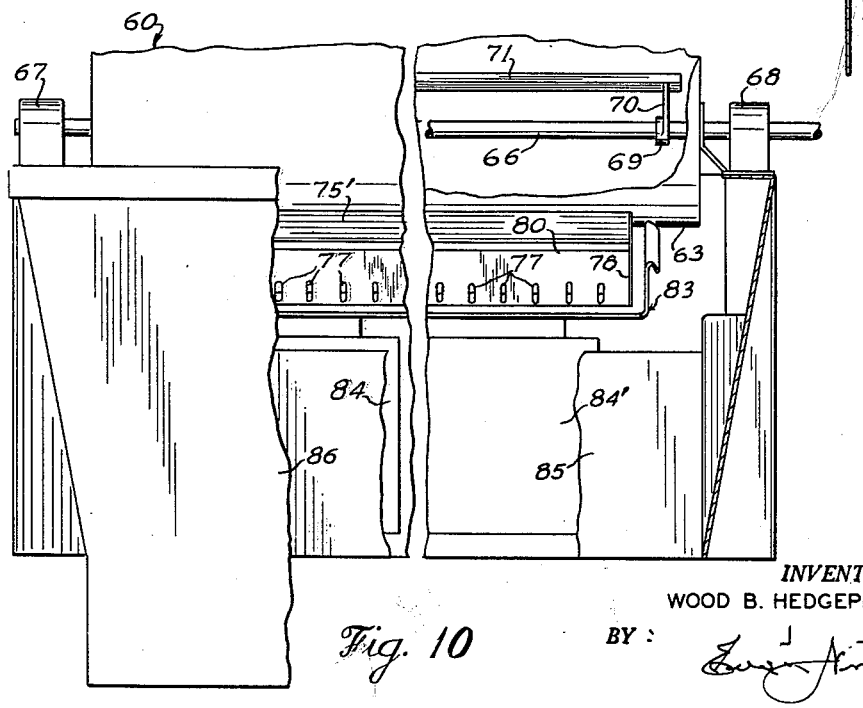
FIG. 10 is a front elevational view, partially in cross section, of the salter as shown in FIG. 9.

In the event that the product to be processed must be salted, there is provided an automatic salter S mounted toward the feed end of the device in FIGS. 1 and 2, and shown in more detail in FIGS. 9 and 10.

The salter comprises a hopper 60 which is provided with a cover plate 61. The forward and rear walls 62, 62' relative to the direction of the movement of the product of hopper 60 converge to join in a rounded bottom portion 63 transverse to the belt. At the lowermost portion of the bottom 63 are two rows of apertures 64 through which the salt may flow into a wide chamber 65. To prevent packing of the salt which may restrict the flow thereof, an agitator is utilized. A shaft 66 runs the width of the hopper, and is journaled for rotation at 67 and 68. Within the hopper, there are collars, such as collar 69, fixed to the shaft from which project arms, as arm 70. The arms 70, in turn, mount a paddle 71 which rotates with shaft 66 to keep the salt in the vicinity of apertures 64 loose enough to flow freely.

The chamber 65 is formed from the bottom 63 of the hopper 60 and an exteriorly mounted plate 75 thereon bent at substantially a right angle to form a bottom plate 76 which contains a transverse row of elongate apertures 77 which extend longitudinally to the frame 10. Side plates 78 are provided to confine the chamber and prevent the salt from spilling over in unwanted quantities.

The front of chamber 65 is formed by a plate 75' having a flange 79 by which it is bolted to plate 76. Between the flange 79 and plate 76 is a slide plate 80 which may be shifted to cover varying portions of the apertures 77 and thus to vary the flow of salt.

From the chamber 65, the salt flows into a feed tray 83 beneath. A pair of vibrators 84, 84' vibrate the tray 83 to shake the salt to the discharge end 84a where it then falls in a substantially uniform sheet between forward and rear upright plates 85 and 86 and deposited on the product below. Though any of a large number of vibrators will operate satisfactorily, it has been found that a vibrator such as the Eries Vibrator is especially successful. Many of the commercial vibrators have a rather large amount of error; whereas, this particular type of vibrator has a high degree of accuracy which will deliver the desired amount of salt within a very close tolerance.

Drive means for the agitator within the salter is provided by a sprocket 87 driven by a chain 88 which is, in turn, driven from a sprocket 89 on the shaft 45.

When processing such foods as nuts, oil must be applied to the product. As seen in FIG. 1, two oilers 90a and 90b are mounted over the conveyor, one near the feed end and the other near the exit end. Since both oilers are identical in construction, only one will be discussed in detail. Each oiler includes a tank 90 having a cover 91 and a conventional liquid level indicator at 92. A tubing 93 is fitted into the bottom of the tank 90, runs along the channel member 11, and is attached to an applicator pipe 94 transverse to and above the conveyor belt. A valve 95 is installed in the tubing 93 to adjust the flow of oil therethrough to the pipe of the particular oiler.

The applicator pipe 94 is so constructed as to give an even flow of oil over the entire width of the conveyor. The pipe 94 has the corner 96 of a length of angle iron 97 welded to the bottom thereof, the flanges 97a of the angle having the same downward pitch. Outwardly and downwardly opening holes 98 are drilled just above the angle iron 97 on each side of the pipe 94, and are staggered, every other hole being on opposite sides of the corner, and the lower edges 97b of the angle are in a substantially common horizontal plane.

In the operation of the device, salt is placed in the hopper 60 of the salter S, and the slide plate 80 is adjusted for the desired salt flow. Oil is placed in the oil tanks 90, and the valves adjusted for proper flow of oil. The fan (not shown) within the vent pipe 32 is energized to start the draft, and the motor 40 is started to start the operation of conveyor, mixers, and salter. The product is then introduced on the conveyor. As the product moves under the salter S, a layer of salt is deposited on the top of the product. The product then passes under the oil applicator pipe 94. The oil runs out of holes 98 and down the angle 97. The alternately spaced holes provide an even distribution of oil across the entire width of the product on the belt 16. The grains of salt, by surface tension, enable more oil to adhere to the nuts than if the salt were absent. A mixer then agitates the product to mix the salt and oil throughout. The product now passes under the hood 28. Cool air is drawn by the fan through the bottom of the device so that the air passes through the lattice-work 17, through conveyor belt 16 to cool the product thereon, and the air passes out through the vent pipe 32. One or more mixers may be provided to agitate the product during its travel under the hood so that even cooling may take place.

After the product passes from underneath the hood 28 and is cool, it passes under a second oil applicator pipe 94, and oil is applied as before. The product is then discharged at the discharge end of the device.

Throughout the travel of the product, the agitation by the mixers will cause the small bits to fall through the conveyor belt 16 and be deposited in the drip trays 25. After the product has been discharged, the empty belt, now under tension and not compression, travels along rollers 18 and is contacted by brush 20 which is driven in the direction opposite to the return flight of belt 16. The brush 20, therefore, brushes the belt and dislodges bits and particles which may adhere thereto; also, the brush 20 will clean off salt and oil which may have accumulated on the belt 16 so that the belt will be clean and ready to receive more product.

With the present device, it has been found that a very high quality product may be obtained, especially when finishing and cooling nuts. The nuts are fed on the conveyor and salt deposited thereon. At the first oil applicator, a soaking oil is applied. This oil soaks into the warm or hot nuts and acts as an undercoat for the finishing oil. The nuts are then passed under the hood 28 to be cooled; thereafter, at the second oil applicator, the finishing oil is applied. This oil will stay on the surface of the nut and impart a very attractive glossy finish to the nut.

The device as described has been found to be very efficient in cooling and finishing a large variety of products, always yielding a very high quality product. The gentle action of the mixers does not break or chip the frangible foods, such as peanuts, pumpkins seeds, sunflower seeds and the like, and has been found satisfactory even for Spanish peanuts, which have the husk that should not be broken. The simplicity of construction renders the machine very easy to clean, thus it is maintainable at such cleanliness that it can easily meet the highest codes of sanitation.

It will of course be understood that the present invention is in no way limited to the particular device here presented by way of illustration, but many changes and modifications may be made, and the full use of equivalents resorted to without departing from the spirit or scope of the invention as outlined in the appended claim.

I claim:

A device for applying treatment of granular solids and liquids to food particles comprising an elongated frame, an endless travelling conveyor on said frame for carrying said particles, said conveyor being characterized by a meshed conveyor belt having upper, forward and lower, return flights, a substantially horizontal lattice-work under the upper flight in engagement therewith, the return flight being under tension substantially from end to end, means for cleaning the lower flight, air suction means over the lattice-work for drawing air through the lattice-work and belt past the deposited food, means for pushing the upper flight over the lattice-work, the lattice-work having the dual function of substantially uniformly supporting the upper flight and permitting air to pass through the belt, means for brushing the belt to clean it during the return flight when tension on the belt tends to open meshes which are smaller during the forward flight, a salting station near the head end of the belt for showering granular solids on the particles, a first liquid application station near the salting station for applying liquid to the particles, a second liquid application station near the tail end of the belt for applying finishing liquid to the particles, one of said liquid application stations being characterized by a horizontal straight pipe, an angle member having depending flanges and a corner edge therebetween secured at said edge along and under the pipe at the lowest portion thereof, the pipe being provided with outlet openings along the length thereof adjacent to and on each side of the edge to allow liquid to issue from the pipe and flow down and across the flanges to the material on said belt, said air suction means being between the ends of the belt.

References Cited by the Examiner

UNITED STATES PATENTS

| | | | |
|---|---|---|---|
| 263,634 | 8/82 | Webster | 198—230 |
| 1,397,658 | 11/21 | Rasmussen | 118—24 |
| 1,423,014 | 7/22 | Peruzzi. | |
| 1,499,347 | 7/24 | Conte | 118—16 |
| 1,524,230 | 1/25 | Bausman | 118—16 |
| 1,620,142 | 3/27 | Thompson | 239—208 |
| 1,831,880 | 11/31 | Pierce | 239—208 XR |
| 2,162,782 | 6/39 | Middleboe | 259—12 |
| 2,212,916 | 8/40 | Hawkins et al. | 62—380 |
| 2,276,383 | 3/42 | Francis | 222—55 |
| 2,431,029 | 11/47 | Duffy | 118—24 |
| 2,636,470 | 4/53 | Rhodes | 118—16 |
| 2,769,531 | 11/56 | Guba | 198—203 |
| 2,783,618 | 3/57 | Mills | 62—380 |
| 2,799,241 | 7/57 | Wurster | 118—24 |
| 2,799,242 | 7/57 | Cain | 118—24 |
| 2,843,080 | 7/58 | Woodruff | 118—16 |
| 2,859,121 | 11/58 | Avera | 99—126 |
| 2,859,861 | 11/58 | Sheehan | 198—203 XR |
| 2,878,926 | 3/59 | Harty et al. | 198—230 |
| 2,906,625 | 9/59 | Livingston | 99—126 |

FOREIGN PATENTS

| | | |
|---|---|---|
| 312,378 | 5/29 | Great Britain. |
| 757,349 | 9/56 | Great Britain. |

RICHARD D. NEVIUS, *Primary Examiner.*

GEORGE A. NINAS, JOSEPH B. SPENCER,
*Examiners.*